United States Patent [19]
Borden et al.

[11] 3,896,161
[45] July 22, 1975

[54] NOVEL ESTERS OF ALKYLOXY AND ALKARYLOXYPOLYETHYLENE GLYCOLS

[75] Inventors: George Wayne Borden, Charleston; David John Trecker, South Charleston, both of W. Va.

[73] Assignee: Union Carbide Corporation, New York, N.Y.

[22] Filed: Apr. 5, 1974

[21] Appl. No.: 458,322

Related U.S. Application Data
[63] Continuation of Ser. No. 245,182, April 18, 1972, abandoned.

[52] U.S. Cl... 260/486 R; 117/139.5 A; 117/140 A; 260/89.5 AW; 260/613 B; 260/615 B
[51] Int. Cl. .............................................. C07c 69/54
[58] Field of Search ................................ 260/486 R

[56] References Cited
UNITED STATES PATENTS

| | | | |
|---|---|---|---|
| 2,396,434 | 3/1946 | Rehberg | 260/486 R |
| 2,815,369 | 12/1957 | Holt | 260/486 R |
| 2,841,567 | 7/1958 | Blanton | 260/486 R |

FOREIGN PATENTS OR APPLICATIONS 828,496   2/1960   United Kingdom............. 260/486 R

*Primary Examiner*—Lorraine A. Weinberger
*Assistant Examiner*—Paul J. Killos
*Attorney, Agent, or Firm*—C. J. Metz

[57] ABSTRACT

Novel compounds represented by the formula

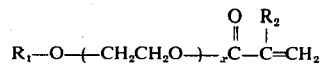

wherein $R_1$ is alkyl containing 8 to 24 carbon atoms, alkaryl wherein the alkyl substituent contains 6 to 12 carbon atoms; $R_2$ is hydrogen or methyl and $x$ is an integer having a value of 3 to 40. These compounds are capable of being radiation polymerized and grafted to a textile substrate to impart surfactant properties to the textile. They are also useful in the preparation of hydrophilic latex binders.

5 Claims, No Drawings

NOVEL ESTERS OF ALKYLOXY AND ALKARYLOXPOLYETHYLENE GLYCOLS

This is a continuation of application Ser. No. 245,182 filed Apr. 18, 1972 now abandoned.

This invention relates to novel esters of alkyloxy and alkaryloxypolyethylene glycols and more particularly the invention is concerned with novel acrylate and methacrylate esters of alkyl and alkaryloxypolyethylene glycols. These compounds possess both hydrophobic and hydrophilic properties, thereby making them eminently suitable as surfactants. Moreover they are capable of being radiation polymerized and grafted to a textile substrate to impart the surfactant properties to the textile. The compounds are also suitable as stain release additives for textile fabrics and as components of hydrophilic latex binders.

The novel monomer compounds can be represented by the generic formula:

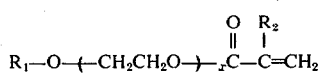

wherein $R_1$ is alkyl containing 8 to 24 carbon atoms, preferably 10 to 20 carbon atoms and most preferably 11 to 15 carbon atoms, alkaryl wherein the alkyl substituent contains 6 to 12 carbon atoms; $R_2$ is hydrogen or methyl and $x$ is an integer having a value of 3 to 40, preferably 3 to 30 and most preferably 3 to 15. Included within the scope of the generic formula are the following compounds: pentadecoxytriethylene glycol acrylate, dodecoxypentaethylene glycol methacrylate, octadecoxyhexaethylene glycol acrylate, pentadecoxyheptaethylene glycol methacrylate, pentadecoxyoctaethylene glycol arcylate, tridecoxynonaethylene glycol methacrylate, tetradecoxydecaethylene glycol acrylate, hexadecoxyundecaethylene glycol acrylate, pentadecoxydodecaethylene glycol acrylate, pentadecoxypentadecaethylene glycol methacrylate, 8-nonylphenoxytriethylene glycol acrylate, m-hexylphenoxyheptaethylene glycol methacrylate, p-dodecylphenoxytetraethylene glycol acrylate, p-nonylphenoxypentadecaethylene glycol methacrylate, and p-nonylphenoxyeicosaethylene glycol acrylate.

The compounds represented by the above formula can be prepared by a variety of conventional procedures as indicated by the following general reactions:

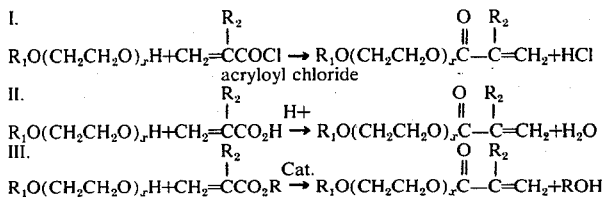

wherein $R_1$, $R_2$ and $x$ have the above indicated values wherein R is an alkyl of 1 to 8 carbon atoms.

As indicated previously the reaction mechanisms indicated above are well known to the art and hence no detailed description of the reaction conditions appears necessary to enable one skilled in the art to practice the invention.

In general, however, reaction I is conducted by adding acryloyl chloride or methacryloyl chloride to the alkyloxy or alkaryloxypolyethylene glycol in a suitable solvent such as benzene or toluene. Advantageously the reaction is conducted in the presence of an acid acceptor such as pyridine or acrylonitrile which reacts with the hydrogen chloride as it is formed.

Reaction II involves the direct esterification of the acid with an alkyl or alkarylpolyethylene glycol of suitable molecular weight, in the presence of an esterification catalyst such as sulphuric acid, or other mineral acid. The esterification reaction commonly is conducted in a suitable still equipped with a fractionating column, in the presence of a water-entraining agent such as benzene for removal by overhead distillation of a water-benzene azeotrope. The residual product is neutralized with a basic alkali metal compound such as sodium hydroxide before removal of the benzene.

The third reaction is a transesterification reaction which is catalyzed by strong acids, strong bases such as sodium methoxide and weaker bases such as tributyl titanate.

The starting material, i.e., the reactants represented by the formula $R_1O(CH_2CH_2O)_xH$ can be prepared according to the following reaction:

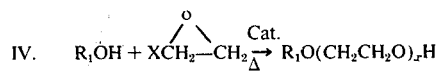

wherein $R_1$ and $x$ have the above indicated values.

The alkyl derivatives are prepared by ethoxylating an alcohol ($R_1OH$) with ethylene oxide at elevated temperatures, generally in the presence of a strong basic catalyst such as sodium hydroxide. The aryl derivatives are prepared by a similar technique under slightly different conditions as known in the art. In the case of the aryl derivative, the $R_1$ value is an alkyl phenol such as nonylphenol.

The methods and products discussed above and indicated in equation IV are well known to those skilled in the art and hence no detailed description is necessary. The physical properties of many of the products are described on pages 7, 24 and 25 of the publication F-6136Y, 1971 Edition of "Chemicals and Plastics Physical Properties," published by Union Carbide Corporation, New York, N.Y.

As mentioned previously the compounds have utility as stain release additives for textile fibers. The textile fabrics which can be treated with the novel compounds of the present invention can be in the form of a woven or nonwoven fabric composed of fibers such as those fabricated from cotton, cotton/polyester blends, cellulose acetate, rayon, wool, nylon 6, nylon 66, polyacrylonitrile, and the various derivatives and blends of the above. If the material is to be directly padded onto a fabric, the solution is diluted to the desired percentage of organic (0.5–20% by weight; usually 5–10% by weight) with a solvent or solvent mixture that permits co-solution of all solutes. Water is preferred, but if solubility difficulties occur, methanol or aqueous methanol can be employed. Other materials may optionally be added to the pad bath. These include emulsifiers, softeners, Lewis acid catalysts (e.g., magnesium or zinc salts), and other additives conventionally employed in textile treatments. Advantageously, however, since the monomers and polymers possess surfactant properties, no surfactant need be added to the pad bath.

The treatment to impart stain resistance to the fabric is conventional and can be carried out in any of the following conventional sequences.

A. Pad solution containing compound of the invention onto fabric, heat cure, irradiate, dry.
B. Pad solution containing compound of the invention onto fabric, heat cure, rewet, irradiate.
C. Pad solution containing compound of the invention onto fabric (with free radical source included, e.g., persulfate), heat cure only.
D. Pad solution containing compound of the invention onto fabric, dry irradiate, heat cure.
E. Pad solution containing compound of the invention onto fabric, irradiate wet, heat cure.
F. Pad solution containing compound of the invention onto fabric, irradiate wet.
G. Pad solution containing compound of the invention onto fabric, dry irradiate.

If the impregnated fabric is to be precured (A and B) or subjected to heat cure only (C), the composition of the pad bath is typically as follows:

| Alkyl or Alkaryloxypolyethylene glycol | 8 parts |
| N-Methylolacrylamide | 5 parts |
| Magnesium chloride | 4 parts |
| Water | 83 parts |

If the material is to be preirradiated (D and E) or irradiated only (F and G), the pad bath need not contain the catalyst. This is applied following the irradiation in the case of D and E and is typically contained in a second pad, the composition of which is normally an acid or basic catalyst such as sodium bicarbonate or magnesium chloride or other known catalysts.

The heat curing, whether carried out before, after, or in lieu of irradiation, consists of holding the treated fabrics in a hot air oven at temperatures of about 100° to 500°F. (preferably 200°–400°F.) for periods of 0 to 10 minutes (preferably 2–5 minutes; most preferably about 3 minutes).

Irradiation may be either particulate or nonparticulate in nature. Particulate radiation includes alpha-particles (helium nuclei), generated from rare gas ion accelerators and beta-ray (electrons), generated from electron accelerators (van de Graaff, Dynamitron, Insulated Core Transformers, etc.). Nonparticulate radiation includes γ-rays, generated from nuclear reactors and natural isotopes (cobalt 60, cesium-137, and the like), and ultraviolet and visible light (2,000–8,000A.) generated from mercury, carbon, xenon, cadmium and krypton arcs, and similar sources. Preferred is electron irradiation. The electrons may be 0.1–3.0 Mev. (million electron volts). Preferred are 0.1–2.0 Mev. electrons; most preferred are 0.1–0.5 Mev. electrons. Radiation doses may range from 0.01 to 20 megarads. Preferred are doses of 0.1 – 10 megarads. Most practical is the dose range of 0.5 – 2 megarads.

The following examples will illustrate the present invention.

EXAMPLE 1

A mixture of $C_{11}$ – $C_{12}$ secondary alcohols with ethylene oxide were reacted to produce an alkoxypoly(ethyleneoxy) ethanol having an average of 9 ethyleneoxy groups in the product. This product is available commercially from Union Carbide Corporation under the trademark TERGITOL 15-S-9. 312 grams of this product and 300 ml. of acrylonitrile were then charged to a flask under a nitrogen atmosphere. Mechanical agitation was begun and a solution of acryloyl chloride (50 grams) in acrylonitrile (100 ml.) was added at a rate sufficient to maintain the reaction temperature under 30°C. The reaction mixture was then stirred under nitrogen at room temperature for 18 hours. Acrylonitrile and chloropropionitrile (reaction product of the evolved hydrogen chloride and acrylonitrile) were stripped away under reduced pressure, leaving a residue product which was identified as pentadecoxynonaethylene glycol acrylate.

EXAMPLE 2

Ethylene oxide was reacted with p-nonylphenol to produce an alkaryloxypoly(ethyleneoxy) ethanol having an average of 20 ethyleneoxy groups in the molecule. This product is available commercially from Union Carbide Corporation under the trademark TERGITOL NP-40. 157 grams of this product together with 15 grams of acryloyl chloride and 400 ml. of acrylonitrile were reacted in the manner described in Example 1. There was produced a residue product which was identified as p-nonylphenoxyeicosaethylene glycol acrylate.

EXAMPLE 3

Ethylene oxide was reacted with p-nonylphenol to produce an alkaryloxypoly(ethyleneoxy) ethanol having an average of 13 ethyleneoxy groups in the molecule. This product is available commercially from Union Carbide Corporation under the trademark TERGITOL NP-33. 225 grams of this product together with 30 grams of acryloyl chloride and 400 ml. of acrylonitrile were reacted in the manner described in Example 1. There was produced a residue product which was identified as p-nonylphenoxytridecaethylene glycol acrylate.

EXAMPLE 4

Ethylene oxide was reacted with a mixture of $C_{11}$ – $C_{15}$ secondary alcohols to produce an alkyloxypoly(ethyleneoxy) ethanol having an average of 3 ethyleneoxy groups in the molecule. This product is available commercially from Union Carbide Corporation under the trademark TERGITOL 15-S-3. 180 grams of this product together with 90 grams of acryloyl chloride and 1 liter of acrylonitrile were reacted in the manner described in Example 1. There was produced a residue product which was identified as pentadecoxytriethylene glycol acrylate.

EXAMPLE 5

Ethylene oxide was reacted with a mixture of $C_{11}$ – $C_{15}$ secondary alcohols to produce an alkyloxypoly(ethyleneoxy) ethanol having an average of 7 ethyleneoxy groups in the molecule. This product is available commercially from Union Carbide Corporation under the trademark TERGITOL 15-S-7. 268 grams of this product together with 90 grams of acryloyl chloride and 1 liter of acrylonitrile were reacted in the manner described in Example 1. There was produced a residue product which was identified as pentadecoxyheptaethylene glycol acrylate.

EXAMPLE 6

Ethylene oxide was reacted with a mixture of $C_{11}$ – $C_{15}$ secondary alcohols to produce an alkyloxypoly(ethyleneoxy) ethanol having an average of 12 ethyleneoxy groups in the molecule. This product is available commercially from Union Carbide Corporation under the trademark TERGITOL 15-S-12. 378 grams of this product together with 90 grams of acryloyl chloride and 1 liter of acrylonitrile were reacted in the manner described in Example 1. There was produced a residue product which was identified as pentadecoxydodecaethylene glycol acrylate.

EXAMPLE 7

Ethylene oxide was reacted with a mixture of $C_{11}$ – $C_{15}$ secondary alcohols to produce an alkyloxypoly(ethyleneoxy) ethanol having an average of 12 ethyleneoxy groups in the molecule. This product is available commercially from Union Carbide Corporation under the trademark TERGITOL 15-S-12. 2240 grams of this product together with 238 grams of acrylic acid, 250 grams of isopropyl ether, 29.7 grams of sulfuric acid and 2.5 grams of allo-ocimene were charged to a flask fitted with a stirrer, thermometer, dropping funnel and a distillation column with a water decanting head. This mixture was heated to reflux under a nitrogen atmosphere. Water produced during the reaction was collected in the decanting head. The reaction (pot) temperature was maintained at 110°C. by the addition of isopropyl ether. About seven hours were required to collect the theoretical amount of water.

The isopropyl ether was then removed by stripping under vacuum (50°C./1mm.). After cooling to room temperature the residue product was inhibited with p-methoxyphenol (400 ppm). The sulfuric acid catalyst was neutralized by the addition of a stoichiometric amount of sodium hydroxide, added as a 20% aqueous solution. Additional water was then added to obtain a 50% aqueous solution of the corresponding acrylates (404 grams).

A portion of the above acrylate product (500 grams) and benzene (250 ml.) were charged to a distillation flask fitted with a stirrer, thermometer and distillation column with a water decanting head. The mixture was heated to reflux until no additional water was collected in the decanting head. The benzene was then removed by stripping under vacuum (50°C./1 mm.). There was thus obtained a sample of anhydrous acrylate esters of the alcohol mix prepared from the ethylene oxide treatment of a mixture of $C_{11}$ – $C_{15}$ secondary alcohols to give an alkaryloxypoly(ethyleneoxy) ethanol having an average of 12 ethyleneoxy groups in the molecule (250 grams). The presence of acrylate in the product was confirmed by infrared analysis. Saponification analysis indicated that the product was 90% ester.

EXAMPLE 8

Ethylene oxide was reacted with a mixture of $C_{11}$ – $C_{15}$ secondary alcohols to produce an alkyloxypoly(ethyleneoxy) ethanol having an average of 12 ethyleneoxy groups in the molecule. This product is available commercially from Union Carbide Corporation under the trademark TERGITOL 15-S-12. 461.4 pounds of this product together with 47.6 pounds of acrylic acid, 55 pounds of isopropyl ether, 6.15 pounds of sulfuric acid and 0.52 pounds of allo-ocimene were charged to a 60-gallon stirred autoclave fitted with a distillation column and reacted in the manner described in Example 7. After 7.5 hours at reaction temperature (110°C.) additional amounts of sulfuric acid (0.6 lbs.) and allo-ocimene (0.05 lbs.) were added to the reaction mixture. The theoretical amount of water was collected in about 11 hours. The inhibitor, p-methoxyphenol (0.1 lbs.) was added before the isopropyl ether was removed. The yield of 50% aqueous alkyloxypoly(ethyleneoxy) ethanol acrylate was 1023 pounds.

EXAMPLE 9

2275 grams of an alkoxypoly(ethyleneoxy) ethanol, produced by the reaction of a mixture of $C_{11}$ – $C_{15}$ secondary alcohols with ethylene oxide and having an average of 12 ethyleneoxy groups in the molecule (2275 grams), methacrylic acid (284 grams), isopropyl ether (250 grams), sulfuric acid (30.7 grams) and allo-ocimene (2.56 grams) were reacted in the manner described in Example 7. The theoretical amount of water was collected in about 11 hours. There was thus obtained samples of 50% aqueous and anhydrous alkyloxypoly(ethyleneoxy) ethyl methacrylate.

EXAMPLE 10

A polyester/cotton (65/35) broadcloth fabric was padded to 100% wet pickup with a solution containing 8 parts of the alkyloxypolyethylene glycol acrylate prepared as in Example 1, 5 parts of N-methylolacrylamide, 4 parts of magnesium chloride and 83 parts of water. The fabric was placed on a pin frame and dried at 80°C. for 10 minutes in a forced-air oven. The fabric was then exposed to 300 kilovolt electrons to an absorbed dose of 2 megarods. The sample and a control of untreated fabric were washed using a commercial detergent and tumble-dried. The treated fabric was free of the wrinkling noted with the control fabric. The treated fabric and control were stained with spots of mineral oil and mustard and then washed and tumble dried as before. The stains on the treated fabric were hardly detectable but the stains on the control were quite obvious. A second wash and tumble dry cycle removed the visible stains from the treated fabric but the stains on the control fabric persisted. Five additional wash-dry cycles of the untreated control failed to remove the stains.

EXAMPLE 11

A standard three liter resin pot equipped with a mechanical stirrer, thermometer, reflux condenser, and two dropping funnels was immersed in a water bath set at 76°C. and was charged with deionized water (774 g.), sodium bicarbonate (2.4 g.) and a potassium persulfate (9.0 g.). After stirring with nitrogen purge for approximately 0.5 hour, until the pot temperature was at 76°C., a mixture of ethyl acrylate (116 g., 200 ppm. MMHQ) and a silicone surfactant (2.4 g.), and pentadecoxydodecaethylene glycol acrylate (50 g.) were added from one dropping funnel over a period of three hours at the same time a 5.3 percent solution (464 g.)

of N-methylolacrylamide was added over the same time span from the second dropping funnel. Throughout the reaction the temperature in the flask was maintained at 79°–80°C. Reaction was continued for 0.5 hour at 80°C. and the flask cooled to 30°C. The pH of the final latex was 4.0 and the resin content was 49.5 percent.

EXAMPLE 12

A latex was made by the procedure described in Example 11 except that pentadecoxytriethylene glycol acrylate was used to replace the pentadecoxydodecaethylene glycol acrylate. The final pH was 3.5 and the total solids was 49.8 percent.

EXAMPLE 13

Example 11 was repeated with 24 g. of acrylic acid, added via the dropping funnel containing the aqueous N-methylolacrylamide solution over a 3-hour period, replacing 24 g. of the fed ethyl acrylate. The final product was an emulsion at a pH of 4.3 and total solids of 48.8 percent.

Although certain preferred embodiments of the invention have been disclosed for purposes of illustration, it will be evident that various changes and modifications may be made therein without departing from the scope and spirit of the invention.

What is claimed is:

1. Compounds represented by the formula:

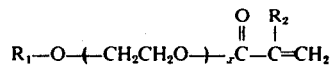

wherein $R_1$ represents alkyl of from 8 to 24 carbon atoms, wherein $R_2$ is hydrogen or methyl, and wherein $x$ represents a number having an average value within the range of from 3 to 40.

2. Pentadecoxynonaethylene glycol acrylate.
3. Pentadecoxytriethylene glycol acrylate.
4. Pentadecoxyheptaethylene glycol acrylate.
5. Pentadecoxydodecaethylene glycol acrylate.

* * * * *